UNITED STATES PATENT OFFICE.

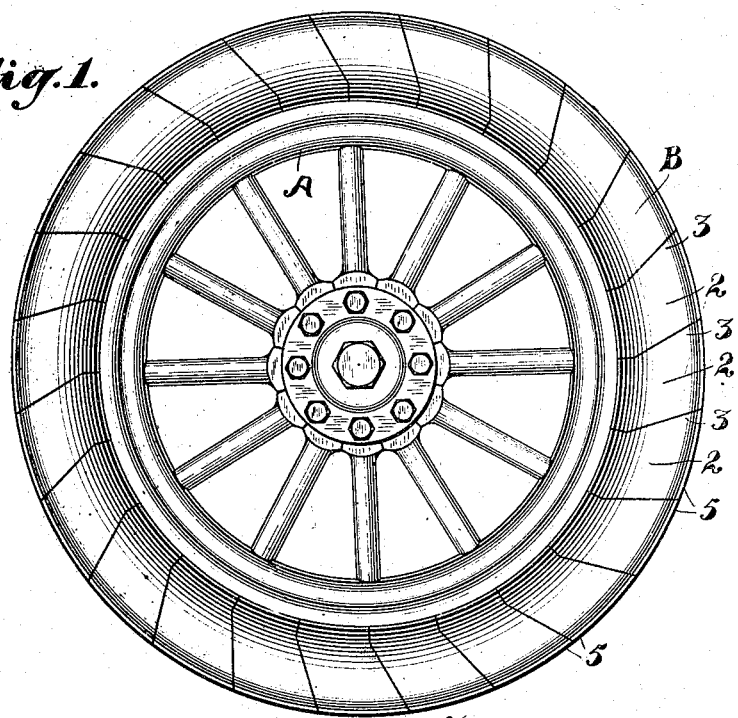
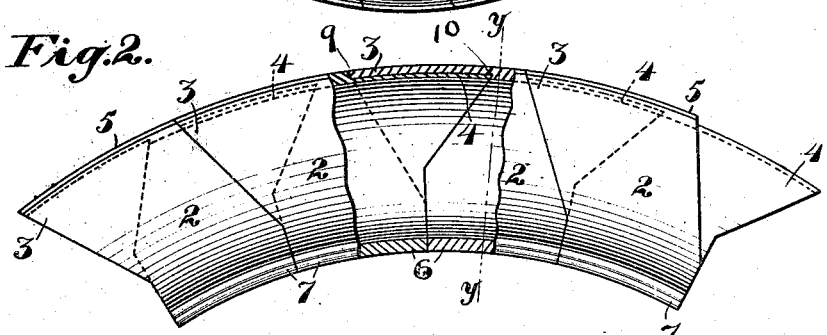
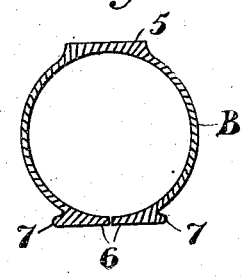

ARTHUR GALE THOMSON, OF SAN FRANCISCO, CALIFORNIA.

CONCAVE VEHICLE-TIRE.

No. 885,888.

Specification of Letters Patent.

Patented April 28, 1908.

Application filed October 29, 1906. Serial No. 341,079.

*To all whom it may concern:*

Be it known that I, ARTHUR GALE THOMSON, citizen of the United States, residing at San Francisco, in the county of San Francisco and State of California, have invented certain new and useful Improvements in Concave Vehicle-Tires, of which the following is a specification.

My invention relates to improvements in concave vehicle tires.

The object of my invention is to provide a concave vehicle tire of metal which is constructed in sections having great resiliency strength and lightness and permitting the ready extraction of a section in case of injury to the same or for some other reason, and the insertion of a fresh section in place thereof, and also having a strong and lasting wearing surface.

My tire is peculiarly adapted to use on automobiles and being preferably constructed of steel is comparatively light.

My invention consists in the novel construction and arrangement of parts described in the following specification, illustrated in the accompanying drawing and claimed in the appended claims.

In the drawings Figure 1 shows an elevation of a vehicle wheel encircled by my tire. Fig. 2 represents a section of the wheel partly broken away to show its interior. Fig. 3 shows a transverse section of part of the tire.

In the figures A represents a vehicle wheel. B in Fig. 1 shows my concave metallic vehicle tire, 2 shows one of the sections of the tire, 3 represents the overlapping tongue of said section and 4 the inner sustaining tongue of the same, the said tongues contacting as shown in Fig. 2 and each section having the overlapping tongue 3 at one end and the inner tongue 4, at the other end so that the overlapping tongue of one section engages the inner sustaining tongue of the other section, thereby forming when all the sections are joined one continuous tire. In Fig. 1 the equidistant lines upon the periphery of the tire indicate the point of joining of the sections exteriorly and the form of the tongues as engaged interiorly is shown by dotted lines in Fig. 2. 9 and 10 indicate shoulders or walls to hold the section in position when adjusted. The tire has a wearing ridge 5 which may be indented, roughened or treated in any other manner to prevent slipping if preferred. The ridges 6 which divide the tire centrally have the flanges 7 which fit in grooves on the rim of the wheel as is well known in the art. The tongue 4 is much thinner than tongue 3 which results in increasing the resiliency of the tire. The walls 9 and 10 are curved adapting them for engagement with the curvature of the tongues, from the ends of which walls the sections run vertically to the base thereof at ridges 6, a plurality of sections as joined in Fig. 2 indicating the lines thereof. The ends of the sections are cut at reverse inclines, and when the sections are in position the abutting ends prevent movement or mutual approach of the sections after being properly adjusted or positioned.

Although I have shown the preferred embodiment of my invention, the form thereof may be somewhat modified, and I therefore reserve the right to make all changes which fall within its spirit and scope.

Having thus described my invention what I claim, and desire to secure by Letters Patent is:

1. A wheel tire composed of a plurality of separable independent counterpart sections, each section comprising a body having a tongue projecting from one edge thereof, and a tongue of equal length but of less thickness projecting from the opposite edge, the said tongues constituting a part of the sides of the tire with the end of one tongue at a reverse incline to the end of the other tongue.

2. A wheel tire composed of a plurality of separable independent counterpart sections telescoping each other, each section embodying an integral tread portion, sides, and rim engaging portion, the ends of the said sections being on reverse inclines preventing the mutual approach of the sections after their adjustment, and the treads of said sections having integral ridges forming a wearing surface for the tire, substantially as described.

3. A wheel tire composed of a plurality of separable independent counterpart sections, each section embodying an integral tread, sides, and a rim engaging portion, said rim engaging portion having divided flange ridges arranged to meet co-incidently, the ends of the sections being cut at reverse inclines to each other and the treads having ridges upon the periphery thereof forming a wearing surface for the tire, substantially as described.

In testimony whereof I affix my signature in presence of two witnesses.

ARTHUR GALE THOMSON.

Witnesses:
C. P. SONNTAG,
L. SONNTAG.